United States Patent [19]

Desprez

[11] Patent Number: 4,531,960
[45] Date of Patent: Jul. 30, 1985

[54] GLASSMAKING PROCESS AND EQUIPMENT

[75] Inventor: Marc Desprez, Courbevoie, France

[73] Assignee: Etude et l'Exploitation des Procedes Georges Claude L'Air Liquide, Societe Anonyme pour , Paris, France

[21] Appl. No.: 611,599

[22] Filed: May 18, 1984

[30] Foreign Application Priority Data

May 20, 1983 [FR] France ............... 83 08362

[51] Int. Cl.³ ............................................. C03B 55/44
[52] U.S. Cl. ........................................ 65/134; 65/136; 65/337
[58] Field of Search ................... 65/337, 134, 135, 136

[56] References Cited

U.S. PATENT DOCUMENTS 3,592,623  7/1971  Shepherd ..................... 65/337 X
4,364,729  12/1982 Fresch ........................... 432/9

FOREIGN PATENT DOCUMENTS 368208  11/1906  France ........................ 65/134
2010199  4/1971  France .
2038247  7/1971  France .

Primary Examiner—Arthur Kellogg
Attorney, Agent, or Firm—Lee C. Robinson, Jr.

[57] ABSTRACT

According to the process, a mixture of powdered mineral substances is introduced at one end of a furnace and this mixture is heated, and the molten glass thus obtained is continuously discharged at the other end of the furnace. The mixture is heated by means of at least one air-fuel flame and at least one oxygen-fuel flame. A current of auxiliary gas which is concentric to and surrounds the oxygen-fuel flame is injected into the furnace.

17 Claims, 3 Drawing Figures

GLASSMAKING PROCESS AND EQUIPMENT

The present invention relates to a glassmaking process.

As is known, glassmaking comprises heating and melting in a furnace a mixture of powdered mineral products termed "glassmaking composition", such as sand mixed with natural products containing among others alkaline and alkaline-earth salts. More precisely, the glassmaking composition is introduced into the furnace in the form of a layer of uneven thickness termed a "carpet". This carpet progressively separates into "clods" which float on the surface of the bath of molten glass previously produced and which are progressively "digested" by the latter and the molten glass is continuously discharged from said furnace. In order to ensure that the glass obtained is of good quality, there must be a good homogenization in temperature and chemical composition in the bath of molten glass, i.e., on one hand, there must be a regular heating of said bath and, on the other hand, the newly-formed clods must melt as rapidly as possible. This is why a number of processes employed at the present time comprise heating the bath of molten glass by means of air-fuel burners evenly spaced apart along a lateral wall of the furnace and heating more intensely the zone in the vicinity of the region where the glassmaking composition is charged, by means of an oxygen-fuel burner.

Among the processes of this type known up to the present time, there may be mentioned the process disclosed in French Pat. No. 2, 010, 199. This patent teaches the use of oxygen-fuel burners cooled with water and placed at the head of the furnace and producing an oxidizing flame which develops in a direction parallel to the surface of the bath of molten glass and along the longitudinal axis of the furnace.

While this process produces glasses of satisfactory quality it has however drawbacks related in particular to the manner of cooling the oxygen-fuel burners employed. Indeed, the fact that the oxygen-fuel burners described hereinbefore are cooled by a liquid, namely water, presents the following problems:

there is a creation of a cold point in the part of the surface of the bath of glass which faces the oxygen-fuel burner, which has for consequence, on one hand, a loss in thermal efficiency (5 to 10 KW), and, on the other hand, disturbances in the circulation currents of the glass produced by the modification, in that region, in the temperature gradients and in the viscosity of the glass;

there is a risk of corrosion of the metal forming the burner; indeed, the water-cooled jacket of the burner is at a temperature lower than 100° C.: there is consequently a condensation on the surface of the burner of vapours of the products present in the glassmaking composition; now this glassmaking composition may contain products such as fluor spar, boric anhydride, soda salts, which will respectively result, upon their condensation, in the formation of hydrofluoric acid, boric acid, soda, which compounds attack the metal constituting the jacket of the burner;

there is a complication of the equipment controlling the fluids since it must be checked at each instant that there is a permanent circulation of water in the jacket.

Further, glassmaking presents problems peculiar to this material. Indeed, the fact that the material to be melted is formed by powder constituting a carpet which floats on a bath of more or less viscous glass, the oxygen-fuel flame must not have an excessively dynamic effect on said carpet; indeed, this would be liable to cause a flying of the powdered products constituting this material which would result in a loss of raw material in the form of solid particles and a mechanical abrasion of the superstructures of the furnace by the currents of exhaust fumes charged with these solid particles. Further, it is preferable to arrange that the oxygen-fuel flame is neither excessively strong since it would produce waves on the surface of the bath of glass in the region where the flame touches the latter, nor excessively narrow or pinched since it would then concern only an excessively limited part of the surface of the bath.

An object of the invention is to provide a process which overcomes the aforementioned drawbacks and solves the specific problems of the melting of the glass.

The process according to the invention comprises introducing at one end of a furnace a mixture of powdered mineral substances forming a carpet which progressively separates into clods floating on the surface of the already-formed molten glass bath, heating said mixture, and continuously discharging at the other end of said furnace the molten glass thus obtained, the heating of said mixture being effected both by means of at least one flame of a fuel and air and at least one flame of fuel and oxygen introduced into said furnace. This process is characterized in that a current of auxiliary gas, concentric to and surrounding said flame, of a fuel and oxygen is injected into the furnace.

According to a feature of the process of the invention, the gas surrounding the oxygen-fuel flame is air and preferably compressed air. It may also be another gas such as nitrogen.

According to another feature of the invention, the flame of a fuel and oxygen surrounded by the current of auxiliary gas is directed onto the clods floating on the bath of glass.

Another object of the invention is to provide equipment for carrying out the considered process.

The equipment according to the invention comprises a furnace provided at one end with means for introducing a mixture of powdered mineral substances, means for heating said mixture, and, at the other end, means for discharging the molten glass obtained, said heating means being formed by at least one air-fuel burner and at least one oxygen-fuel burner. According to the invention, the oxygen-fuel burner is surrounded in at least a part of its length with a sleeve concentric to said burner, in which sleeve an auxiliary gas circulates.

The features and advantages of the invention will be apparent from the following description which is given by way of a non-limiting example, with reference to the accompanying drawing in which.

Figure 1:
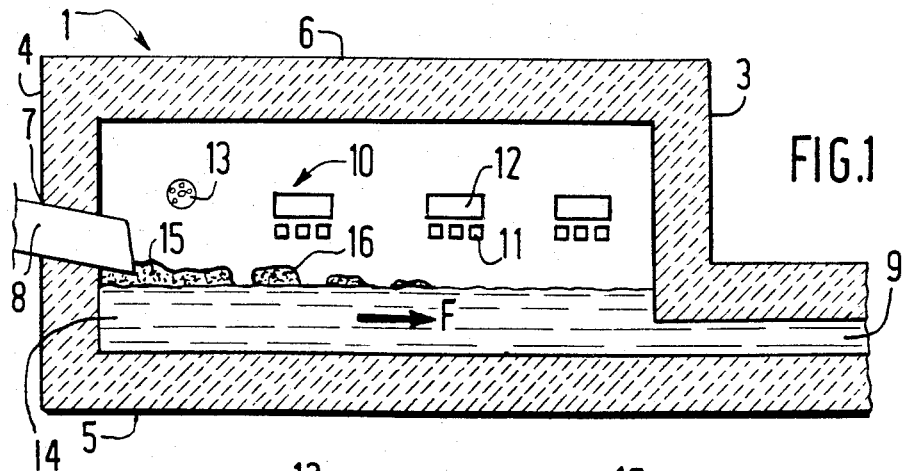
FIG. 1 is a partial diagrammatic view, in longitudinal section, of a glassmaking equipment according to the invention.
Figure 2:
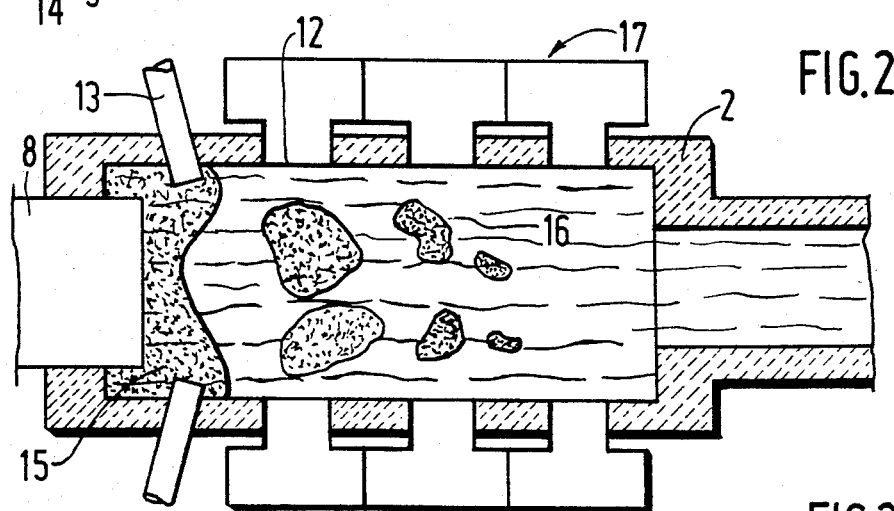
FIG. 2 is a partial diagrammatic top view of the equipment of FIG. 1.

With reference to FIGS. 1 and 2, a glassmaking equipment comprises a fusion furnace 1 which has two lateral walls 2, a front wall 3 and a rear wall 4, a hearth 5 and a vault 6. An orifice 7 is formed in the rear wall 4 to permit the passage of a mineral charge distributor 8, named a charger. The front wall 3 has an orifice 9 in its lower part for discharging the molten glass. Air-fuel burners 10 (including fuel injectors 11 and a hot air inlet 12) are mounted in the lateral walls 2 of the furnace 1 and evenly spaced apart in a row along these walls. An oxygen-fuel burner 13 is mounted in each of the lateral walls 2.

The lower part of the furnace 1 contains a bath of molten glass 14 coming from the fusion of the mixture of mineral substances introduced into and heated in the furnace. This mixture first of all forms a carpet 15 which progressively separates into clods 16 which float for a certain time on the surface of the bath 14 before melting. The molten glass which flows in the direction of arrow F is discharged continuously through the orifice 9. Each oxygen-fuel burner 13 is inclined relative to the surface of the bath 14 and relative to the wall 2 so that the flame it produces is directed onto the clods 16. The angle of the burner 13 relative to the surface of the bath of glass is about 0° to 30° and preferably 10° to 20°.

Mounted on each of the lateral walls 2 is a heat-exchanger 17 effecting a heat exchange between the air supplied to the burners 10 and the smokes discharged from the furnace. This heat exchanger 17 is of the conventional inversion type.

Figure 3:
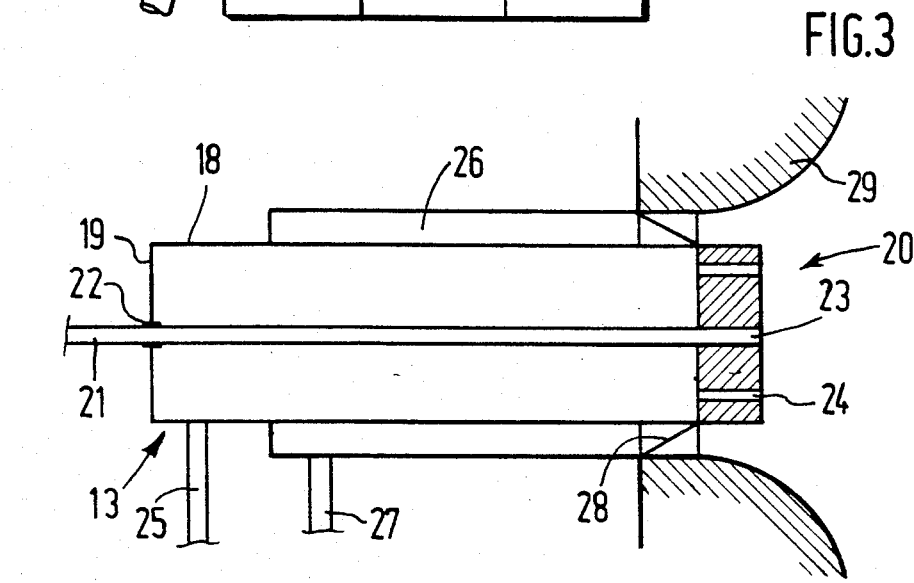
FIG. 3 is a diagrammatic longitudinal sectional view of an embodiment of an oxygen-fuel burner employed in an equipment according to the invention.

With reference to FIG. 3, each of the oxygen-fuel burners 13 comprises a hollow cylindrical body 19 provided with an end plate 19 and a nose 20. The body 18 of the burner has extending therethrough a central pipe 21 supplying fuel (for example a gaseous hydrocarbon such as methane or a liquid hydrocarbon such as fuel-oil) and passing through the end plate 19 through an orifice 22 and through the nose 20 of the burner by way of an orifice 23. The nose 20 of the burner is formed by a circular plate provided with the central orifice 23 for the passage of the fuel and orifices 24 which are evenly spaced apart around the central orifice 23. The body 18 is supplied with oxygen through the conduit 25, which oxygen issues through the orifices 24.

A sleeve 26 which is concentric to the body of the burner 18 surrounds the latter on a part of its length. This sleeve 26 is supplied with compressed air through the conduit 27. The sleeve 26 is provided with fins 28 for rotating the air circulating in said sleeve. This sleeve 26 is slidably mounted on the body 18 of the burner so that it is possible to adjust the distance therebetween and the nose 20 of the burner.

The body 18 of the burner provided with the sleeve 26 is inserted into the furnace 1 by partly driving it into a refractory cowl 29.

The equipment shown in FIGS. 1 to 3 operates in the following manner:

The mixture of powdered mineral substances is introduced by means of the charger 8 into the furnace 1 and, at the same time, the furnace is heated by means of air-fuel burners 10 and oxygen-fuel burners 13. A bath of molten glass 14 is formed on which float the last-formed clods 16. The flame coming from each of the oxygen-fuel burners 13 is directed onto these clods by consequently inclining these burners. Thus, the newly-formed clods 16 melt more rapidly and the bath of molten glass 14 is progressively refined as the heating proceeds. The molten glass thus obtained is discharged through the orifice 9.

In order to avoid the use of an excessively dynamic flame, the oxygen is injected into each burner 13 at a velocity distinctly lower than the velocity of sound, namely at a velocity of about 30 m/s to about 150 m/s and preferably a velocity of 60 m/s to 120 m/s. In the case where the fuel is a gas, it is injected at a velocity substantially equal to that of the oxygen so that there is no excessively rapid mixture of the two gasses as soon as they issue from the burner so that a long and voluminous flame which well covers the surface of the bath 14 is obtained.

By means of the auxiliary gas flowing in the sleeve 26 of each burner 13 at a rate of flow of 10 to 40 m³/h, the geometry of the flame produced by the burner is adapted to the dimensions of the furnace; i.e. if a more pinched or narrow flame is desired, the current of auxiliary gas is injected coaxially of the fuel and oxygen flame and advantage is taken of the impulse of the current of auxiliary gas; on the other hand, if a more voluminous flame is desired, the current of auxiliary gas is made to rotate in the sleeve 26 by the fins 28.

By using in accordance with the invention a current of auxiliary gas as the cooling agent of each burner 13, the body of the burner may be maintained at a temperature of 300° C. to 500° C., while the temperature of the nose of the burner (which is mainly a function of the oxygen flow) varies from 400° C. to 800° C. for a furnace temperature of 1400° C. With these temperatures of the body of the burner, the vapour condensations are limited and there are consequently no problems of corrosion. As an illustration of this advantage, there are given in the following table the temperatures reached by the nose and by the body of the air-cooled burner, taking into account the extent to which the burner is inserted into the cowl and the flow of the cooling air.

| Insertion of the burner in the cowl (cm) | Air flow ($m^3 \cdot h^{-1}$) | Temperature of the nose (°C.) | Temperature of the body (°C.) |
|---|---|---|---|
| 8 | 5 | 676 | 465 |
| 12 | 15 | 675 | 467 |
| 16 | 25 | 739 | 464 |
| 20 | 35 | 772 | 472 |

Further, the fact of using a concentric current of auxiliary gas around the oxygen-fuel flame enables the refractory cowl 29 in which each burner 13 is placed to be protected. Indeed, this auxiliary gas creates a tube of current surrounding the oxygen-fuel flame and prevents the flame from touching the cowl. Moreover, the use of this concentric current of auxiliary gas enables each burner 13 to be completely sealed relative to the furnace; indeed, the auxiliary gas circulating sleeve 26 can touch the cowl since, as it is at a rather higher temperature, there is no excessive temperature difference between the sleeve and the cowl and therefore there is no risk of deterioration of the latter. In this way parasitic cold air entries which have an adverse effect on the thermal efficiency of the flame are avoided.

What is claimed is:

1. A glassmaking process comprising introducing, at a first end of a furnace, a mixture of powdered mineral substances forming a carpet which progressively separates into clots on a surface of a bath of already-formed molten glass, heating said mixture and continuously discharging, at a second end of the furnace opposed to said first end, the molten glass thus obtained, the heating of the mixture being effected by means of at least one flame of a fuel and oxygen so as to heat, in a more intense manner than the rest of the furnace, the zone in the vicinity of a region where the mixture of powdered mineral substances is charged, with a current of auxiliary gas surrounding the flame of the fuel and oxygen being injected into the furnace, and with said flame of fuel and oxygen thus surrounded by the current of auxiliary gas being directed onto clods of said powdered mineral substances floating on the bath of molten glass, wherein the current of auxiliary gas is injected generally axially around the flame of fuel and oxygen.

2. A glassmaking process according to claim 1, further comprising heating said mixture by means of at least one flame of a fuel and air along a lateral wall of the furnace.

3. A process according to claim 1, wherein the auxiliary gas is air.

4. A process according to claim 2, wherein the auxiliary gas is compressed air.

5. A process according to claim 1, wherein the oxygen participating in said flame of a fuel and oxygen is injected at a velocity of about 30 m/s to about 150 m/s.

6. A process according to claim 5, wherein the oxygen is injected at a velocity of about 60 m/s to about 120 m/s.

7. A process according to claim 1, wherein the current of auxiliary gas is injected with a rate of flow of 10 to 40 m$^3$/h.

8. A glassmaking process according to claim 1, further comprising cooling of the burner by means of said generally coaxial flow of the auxiliary gas about said flame.

9. A glassmaking process according to claim 1, further comprising selecting the geometry of the flame with said flow of auxiliary gas.

10. A glassmaking process comprising introducing, at a first end of a furnace, a mixture of powdered mineral substances forming a carpet which progressively separates into clods on a surface of a bath of already-formed molten glass, heating said mixture and continuously discharging, at a second end of the furnace opposed to said first end, the molten glass thus obtained, the heating of the mixture being effected by means of at least one flame of a fuel and oxygen so as to heat, in a more intense manner than the rest of the furnace, the zone in the vicinity of a region where the mixture of powdered mineral substances is charged, with a current of auxiliary gas surrounding the flame of the fuel and oxygen being injected into the furnace, and with said flame of fuel and oxygen thus surrounded by the current of auxiliary gas being directed onto clods of said powdered mineral substances floating on the bath of molten glass, wherein the current of auxiliary gas as it is injected is caused to rotate about said flame of fuel and oxygen.

11. Equipment for carrying out a glassmaking process, wherein a mixture of powdered mineral substances forms a carpet which progressively separates into clods which float on the surface of an already-formed molten glass bath, comprising a furnace, means for introducing the powdered mineral substances adjacent a first end of the furnace, means for heating said mineral substances during their passage through the furnace, means for discharging the molten glass obtained adjacent a second end of the furnace opposed to said first end, said heating means comprising at least one oxygen-fuel burner, which oxygen-fuel burner is directed toward said clods floating on the bath of molten glass, and a coaxial sleeve combined with means for supplying an auxiliary gas and means for injecting a generally axial current of said auxiliary gas around the flame of said oxygen fuel burner, said sleeve surrounding at least a part of the length of said oxygen fuel burner such that said current of said auxiliary gas serves to prevent overheating of said burner without causing condensation of contaminant materials from the furnace gases onto said burner.

12. Equipment according to claim 11, further comprising at least one air-fuel burner for heating said mineral substances.

13. Equipment according to claim 11, wherein the oxygen-fuel burner is mounted in a lateral wall of the furnace.

14. Equipment according to claim 11, wherein the oxygen-fuel burner in inclined to the horizontal at an angle of 0° to 30°.

15. Equipment according to claim 14, wherein the oxygen-fuel burner is inclined to the horizontal at 8° to 20°.

16. Equipment according to claim 11, wherein the auxiliary gas-circulating sleeve is mounted to be slidable along said oxygen-fuel burner.

17. Equipment for carrying out a glassmaking process, wherein a mixture of powdered mineral substances forms a carpet which progressively separates into clods which float on the surface of an already-formed molten glass bath, comprising a furnace, means for introducing powdered mineral substances adjacent a first end of the furnace, means for heating said mineral substances during their passage through the furnace, means for discharging the molten glass obtained adjacent a second end of the furnace opposed to said first end, said heating means comprising at least one oxygen-fuel burner, which oxygen-fuel burner is directed toward said clods floating on the bath of molten glass, a coaxial circulating sleeve combined with means for supplying an auxiliary gas, means for injecting a current of said auxiliary gas around the flame of said oxygen fuel-burner, with the sleeve surrounding at least a part of the length of said oxygen-fuel burner, and fins on said auxiliary-gas circulating sleeve for rotating the auxiliary gas.

* * * * *